United States Patent

Blum et al.

[11] Patent Number: 5,331,039
[45] Date of Patent: Jul. 19, 1994

[54] WATER-BASED BINDER COMPOSITION AND ITS USE FOR THE PRODUCTION OF COATING OR SEALING COMPOSITIONS

[75] Inventors: Harald Blum, Wachtendonk; Werner Kubitza; Joachim Probst, both of Leverkusen; Michael Sonntag, Odenthal; Volker Schneider, Wachtendonk, all of Fed. Rep. of Germany

[73] Assignee: Bayer Aktiengesellschaft, Leverkusen, Fed. Rep. of Germany

[21] Appl. No.: 973,368

[22] Filed: Nov. 9, 1992

[30] Foreign Application Priority Data

Nov. 14, 1991 [DE] Fed. Rep. of Germany ....... 4137429

[51] Int. Cl.$^5$ .............................................. C08L 67/00
[52] U.S. Cl. .................................... 524/507; 524/513; 524/591; 524/839; 524/840
[58] Field of Search ............... 324/507, 591, 513, 840, 324/839

[56] References Cited

U.S. PATENT DOCUMENTS

| | | | |
|---|---|---|---|
| 4,608,413 | 8/1982 | Machtkamp et al. | 524/591 |
| 4,717,738 | 6/1988 | Fuduka et al. | 526/209 |
| 5,075,370 | 12/1991 | Kubitza et al. | 524/591 |

FOREIGN PATENT DOCUMENTS 496205 7/1992 European Pat. Off. .

Primary Examiner—Joseph L. Schofer
Assistant Examiner—Jeffrey T. Smith
Attorney, Agent, or Firm—Joseph C. Gil; Thomas W. Roy

[57] ABSTRACT

The present invention relates to a water-based binder composition containing

A) an aqueous solution or dispersion of a water-dilutable organic polyol component containing a mixture of at least 5% by weight each of at least two hydroxyfunctional polymers selected from A1) polyester resins containing hydroxyl, urethane and carboxylate groups, A2) polyester resins containing hydroxyl and carboxylate groups, but no urethane or sulfonate groups, A3) polyester resins containing hydroxyl and sulfonate groups and, optionally, carboxylate groups and/or urethane groups, A4) polyacrylate resins containing hydroxyl, carboxylate and/or sulfonate groups, A5) acrylate-grafted polyester resins containing hydroxyl, carboxylate and/or sulfonate groups, and B) a polyisocyanate component which is emulsified in the aqueous solution or dispersion A), has a viscosity at 23° C. of 50 to 10,000 mPa.s and contains at least one organic polyisocyanate, wherein the NCO:OH equivalent ratio, based on the isocyanate groups of component B) and the hydroxyl groups of the polyol component present in A), is 0.2:1 to 5:1.

The present invention also relates to a process for the production of a coating or sealing composition containing this aqueous binder composition.

10 Claims, No Drawings

WATER-BASED BINDER COMPOSITION AND ITS USE FOR THE PRODUCTION OF COATING OR SEALING COMPOSITIONS

BACKGROUND OF THE INVENTION

1. Field of the Invention

This invention relates to a water-containing binder composition based on polyisocyanates and mixtures of at least two different water-dispersible or water-soluble polyol components polymers, to a process for the production of these binder compositions and to their use as binders for coating and sealing compositions.

2. Description of the Prior Art

Ecological factors play an important part in coatings technology. A particularly important problem is to reduce the quantities of organic solvents used in coating compositions.

In the case of chemically crosslinking polyurethane lacquers, which are particularly important in the coating field by virtue of their outstanding properties, it has not been possible until very recently to eliminate the use of organic solvents. The use of water instead of organic solvents in two-component polyurethane coating compositions based on polyisocyanates containing free isocyanate groups did not appear possible for some considerable time because isocyanate groups are known to react not only with alcoholic hydroxyl groups, but also with water. In addition, the concentration of active hydrogen atoms from water in these systems is far higher than the concentration of hydroxyl groups from the organic NCO-reactive component. Accordingly, it must be assumed that the isocyanate/water reaction with formation of urea and carbon dioxide takes place in the ternary polyisocyanate/organic polyhydroxyl compound/water system. This isocyanate/water reaction is detrimental because it does not result in crosslinking of the organic polyhydroxyl compounds and also causes foaming of the mixture through the formation of carbon dioxide.

It was only recently recognized (DE-OS 3,829,587) that selected polyhydroxy polyacrylates could be combined with polyisocyanates containing free isocyanate groups to form water-based two-component systems. These coating compositions have a pot life of several hours and cure to form high-quality crosslinked films which are comparable in their properties to coatings previously obtained from solvent-containing two-component polyurethane coating compositions.

It has now been found that certain mixtures of water-containing polymer polyols based on at least two different polyester- and/or polymer-based polymers and polyisocyanates containing free isocyanate groups can also be used as binders. These binders have long pot lives, excellent flow during film formation and good pigment wettability.

SUMMARY OF THE INVENTION

Accordingly, the present invention relates to a water-based binder composition containing A) an aqueous solution or dispersion of a water-dilutable organic polyol component containing a mixture of at least 5% by weight each of at least two hydroxy-functional polymers selected from A1) polyester resins containing hydroxyl, urethane and carboxylate groups and having a molecular weight ($M_w$) of 3000 to 100,000, a hydroxyl number of 20 to 240, an acid number (based on all of the carboxyl groups, wherein 25 to 100% are present in carboxylate form) of 8 to 60 and a urethane group content (—NH—CO—O—) of 1.0 to 15.0% by weight, A2) polyester resins containing hydroxyl and carboxylate groups, but no urethane or sulfonate groups, and having a molecular weight ($M_w$) of 1000 to 50,000, a hydroxyl number of 15 to 240 and an acid number (based on all of the carboxyl groups, wherein 25 to 100% are present in carboxylate form) of 15 to 90, A3) polyester resins containing hydroxyl and sulfonate groups and, optionally, carboxylate groups and/or urethane groups and having a molecular weight ($M_w$) of 1000 to 50,000, a hydroxyl number of 15 to 240 and an acid number (based on all the sulfonic acid and optional carboxyl groups, wherein 25 to 100% are present in salt form) of 3 to 45, A4) polyacrylate resins containing hydroxyl, carboxylate and/or sulfonate groups and having a molecular weight ($M_w$) of 500 to 100,000, a hydroxyl number of 15 to 270 and an acid number (based on all the carboxyl and sulfonic acid groups, wherein 25 to 100% are present in salt form) of 5 to 125 and A5) acrylate-grafted polyester resins containing hydroxyl, carboxylate and/or sulfonate groups and having a molecular weight ($M_w$) of 3000 to 100,000, a hydroxyl number of 20 to 300 and an acid number (based on all the carboxyl and sulfonic acid groups, wherein 25 to 100% are present in salt form) of 5 to 75, and B) a polyisocyanate component which is emulsified in the aqueous solution or dispersion A), has a viscosity at 23° C. of 50 to 10,000 mPa.s and contains at least one organic polyisocyanate, wherein the NCO:OH equivalent ratio, based on the isocyanate groups of component B) and the hydroxyl groups of the polyol component present in A), is 0.2:1 to 5:1.

The present invention also relates to a process for the production of a coating or sealing composition containing this aqueous binder composition by i) emulsifying a polyisocyanate component B) having a viscosity at 23° C. of 50 to 10,000 mPa.s and containing at least one organic polyisocyanate in an aqueous solution or dispersion of a water-dilutable organic polyol component A) containing at least two components selected from A1), A2), A3), A4) and A5) at an NCO:OH equivalent ratio of components A) and B) of 0.2:1 to 5:1 and ii) incorporating any optional auxiliaries and additives in the solution or dispersion A) before the addition of the polyisocyanate component.

DETAILED DESCRIPTION OF THE INVENTION

Component A) is an aqueous solution or dispersion (generally, both dissolved and dispersed particles are present) of a mixture of at least two polyol components. The aqueous solution or dispersion generally has a water content of 35 to 80% by weight, preferably 45 to 70% by weight.

The polyol mixtures which are dissolved and/or dispersed in component A) contain at least two hydroxyfunctional polymers selected from different groups A1), A2), A3), A4) and A5) in an amount of at least 5% by weight each, preferably at least 15% by weight each, based on the total weight of the mixture.

Several hydroxy-functional polymers from one of the above-mentioned groups A1) to A5) may be used provided that at least two of the groups are present in the minimum quantity set forth. Although less preferred, it is also possible to use other hydroxy-functional polymers, e.g., polyesters, polyurethanes and/or polyepoxides, and reactive thinners, in particular water-soluble polyhydric alcohols having a molecular weight of 62 to 200, such as ethylene glycol, glycerol and trimethylolpropane.

Component A1) is selected from polyester resins containing urethane, carboxylate and hydroxyl groups which preferably have a molecular weight ($M_w$, weight average, as determined by gel permeation chromatography using a calibrated polystyrene as standard) of 3000 to 100,000, more preferably 6000 to 50,000; a hydroxyl number of 20 to 240, preferably 45 to 190, mg KOH/g; an acid number, based on all the carboxyl groups, of 8 to 60 and preferably 11 to 40 mg KOH/g; and a urethane group content (—NH—CO—O—) of 1.0 to 15.0%, preferably 4.0 to 12.5%, by weight, wherein the values for the hydroxyl number, acid number and urethane content are based on solids. 25 to 100%, preferably 40 to 100%, of the carboxyl groups are present in the salt form, i.e., in carboxylate form.

In the production of the binder composition according to the invention, component A1) is generally used in the form of a 20 to 65% by weight, preferably 30 to 55% by weight, aqueous solution or dispersion and has a viscosity of 10 to 30,000, preferably 50 to 10,000 mPa.s at 23° C. and a pH of 3 to 10, preferably 6 to 9.

Depending upon the molecular weight of the polyester resins A1) containing urethane, carboxylate and hydroxyl groups, the content of carboxyl or carboxylate groups, the type of neutralizing agent used and whether auxiliary solvents are present, the polyester resins A1) may be present in the form of a solution or dispersion, although both dissolved and dispersed components are generally present.

The polyester resins A) containing urethane, carboxylate and hydroxyl groups may be produced by various methods, for example, by reacting a) 65 to 94% by weight, preferably 70 to 89% by weight, of a polyester polyol having a hydroxyl number of 50 to 500, preferably 80 to 350 and an acid number of ≦12, preferably ≦4, b) 0 to 35% by weight, preferably 0 to 15% by weight of at least one amino- and/or hydroxy-functional compound which is different from components a) and c), has a functionality of 1 to 4 in the isocyanate addition reaction and has a molecular weight of 32 to 2000, c) 2.0 to 7.5% by weight, preferably 3.0 to 6.5% by weight, of a 2,2-bis-(hydroxymethyl)-alkane carboxylic acid or a tertiary amine salt of such an acid in quantities corresponding to the required quantity of acid and d) 5 to 30% by weight, preferably 7 to 22% by weight, of at least one polyisocyanate having two or more isocyanate groups and a molecular weight of 168 to 1500, wherein the percentages of a) to d) add up to 100%.

The reaction may be carried out in a 40 to 99% organic solution by initially introducing components a), b) and c) in an organic solvent and reacting them with component d) at temperatures of 40° to 140° C. in the presence of 0 to 2.5% by weight of a suitable catalyst until hardly any free NCO groups can be detected.

Thereafter, the reaction mixture is dispersed or dissolved in water. At least some, preferably 25 to 100%, of the carboxyl groups introduced into the reaction product are converted into salt form, i.e., into carboxylate groups, during the reaction or before or after the dispersing or dissolving step by the addition of a base. The organic solvent is optionally removed completely or partly from the reaction mixture by distillation before, during or after preparation of the dispersion or solution. The use of solvents is a preferred embodiment. It is also possible to carry out the reactions mentioned in the absence of solvents.

A second method of producing polyester resins A1) containing urethane, carboxylate and hydroxyl groups is by reacting e) 60 to 97% by weight, preferably 70 to 95% by weight, of a polyester polyol having a hydroxyl number of 50 to 500, preferably 80 to 350 and an acid number of ≦12, preferably ≦4, f) 2 to 20% by weight, preferably 4 to 15% by weight, of a di-, tri- and/or tetracarboxylic anhydride and g) 0.1 to 20% by weight, preferably 0.5 to 12% by weight, of at least one polyisocyanate having two or more isocyanate groups and a molecular weight of 168 to 1500, wherein the percentages of e), f) and g) add up to 100%.

The reaction may be carried out in a 40 to 99% organic solution or in the absence of solvents by initially introducing component e) optionally in solvent and reacted this component with component f) at temperatures of 90 to 160° C. with opening of the arthydride ring and subsequently reacting component g) at 70° to 140° C. in the presence of 0 to 2.5% catalyst until hardly any free NCO groups can be detected. Afterwards, the reaction mixture is dispersed and/or dissolved in water. At least some (preferably 25 to 100%) of the carboxyl groups introduced into the reaction product are converted into carboxylate groups during the reaction or before or after the dispersing or dissolving step by addition of a base. The organic solvent is optionally completely or partly removed from the reaction mixture by distillation before, during or after preparation of the dispersion or solution.

The polyester resins A2) containing hydroxyl and carboxyl groups may be produced in known manner, for example, by reacting h) 75 to 98%, preferably 85 to 96%, by weight of a polyester polyol having a hydroxyl number of 50 to 500, preferably 80 to 350 and an acid number of ≦12, preferably ≦4 and i) 2 to 25%, preferably 4 to 15% by weight of a di-, tri- and/or tetracarboxylic anhydride, wherein the percentages of h) and i) add up to 100%.

The reaction may be carried out in a 40 to 99% organic solution or in the absence of solvents by initially introducing component h) together with the optional solvent and reacting this component with component i) at temperatures of 90° to 160° C. with opening of the arthydride ring. The reaction mixture is subsequently dispersed or dissolved in water. At least a portion (25 to 100%) of the carboxyl groups introduced into the reaction product are converted into carboxylate groups during the reaction or before or after the dissolving or dispersing step by the addition of a base. The organic solvent is optionally completely or partly removed from the reaction mixture by distillation before, during or after preparation of the dispersion or solution.

The polyester polyols a), e) and h) may be prepared in known manner, e.g., by the polycondensation of a1) 0 to 60% by weight of monocarboxylic acids having a molecular weight of 112 to 340, a2) 10 to 65% by weight of polycarboxylic acids having a molecular weight of 98 to 600 or anhydrides thereof, a3) 5 to 70% by weight of difunctional or higher alcohols having a molecular weight of 62 to 2000, a4) 0 to 30% by weight of monohydric alcohols having a molecular weight of 100 to 299, a5) 0 to 15% by weight of hydroxycarboxylic acids having a molecular weight of 90 to 280 or lactones thereof, a6) 0 to 15% by weight of aminoalcohols having a molecular weight of 61 to 300 and/or aminocarboxylic acids having a molecular weight of 75 to 260, wherein the percentages of a1) to a6) add up to 100.

The reaction may optionally be carried out in the presence of known esterification catalysts, preferably by melt or azeotropic condensation at temperatures of 140° to 240° C. with removal of water.

Suitable monocarboxylic acids a1) include benzoic acid; tert. butyl benzoic acid; hexahydrobenzoic acid; saturated fatty acids such as 2-ethyl hexanoic acid, isononanoic acid, coconut oil fatty acid, hydrogenated technical fatty acids or fatty acid mixtures; decanoic acid; dodecanoic acid; tetradecanoic acid; stearic acid; palmitic acid; docosanoic acid; unsaturated fatty acids such as soybean oil fatty acid, sorbic acid, peanut oil fatty acid, conjuene fatty acids, tall oil fatty acid or safflower oil fatty acid; and mixtures of these or other monocarboxylic acids.

Suitable higher carboxylic acids a2) or anhydrides include phthalic acid (arthydride), isophthalic acid, terephthalic acid, tetrahydrophthalic acid (anhydride), hexahydrophthalic acid (anhydride), maleic acid (anhydride), succinic acid (arthydride), fumaric acid, adipic acid, sebacic acid, azelaic acid, dimer fatty acids, trimer fatty acids, trimellitic acid (anhydride), pyromellitic acid (anhydride) and mixtures of these or other acids.

Suitable polyhydric alcohols a3) include ethylene glycol, 1,2- and 1,3-propylene glycol, 1,3-, 1,4-, 2,3-butanediol, 1,6-hexanediol, 2,5-hexanediol, trimethyl hexanediol, diethylene glycol, triethylene glycol, hydrogenated bisphenols, 1,4-cyclohexanediol, 1,4-cyclohexane dimethanol, neopentyl glycol, tricyclodecanediol, 1,4-butanediol, trimethylol propane, glycerol, pentaerythritol, trimethyl pentanediol, dipentaerythritol and mixtures of these or other polyhydric alcohols.

Suitable monohydric alcohols a4) include n-hexanol, cyclohexanol, decanol, dodecanol, tetradecanol, octanol, octadecanol, natural fatty alcohol mixtures such as Ocenol 11/130 (Henkel KGaA) and mixtures of these and other alcohols.

Suitable starting components a5) include dimethylol propionic acid, lactic acid, malic acid, tartaric acid, ε hydroxycaproic acid, castor oil fatty acid or ε caprolactone.

Suitable starting components a6) include aminoethanol, 2-aminopropanol, diethanolamine, aminoacetic acid or 6-aminohexanoic acid.

Preferred polyester polyols a), e) and h) contain a1) 0 to 55% by weight of $C_{7-20}$ monocarboxylic acids such as benzoic acid, 2-ethyl hexanoic acid, isonanoic acid, hydrogenated technical fatty acids or mixtures thereof (such as Prifrac 2950, Prifrac 2960, Prifrac 2980, products of Unichema International), stearic acid, palmitic acid, peanut oil fatty acid and/or soybean oil fatty acid, a2) 15 to 56% by weight of di- and/or tricarboxylic acids or arthydrides such as phthalic anhydride, hexahydrophthalic arthydride, isophthalic acid, maleic arthydride, terephthalic acid, fumaric acid, adipic acid, benzene tricarboxylic acid and/or dimer fatty acid and a3) 25 to 65% by weight of dihydric and/or higher alcohols such as ethylene glycol, 1,2-propylene glycol, 1,6-hexanediol, 1,4-cyclohexane dimethanol, neopentyl glycol, trimethylol propane, glycerol and/or pentaerythritol, wherein the percentages add up to 100%.

The starting component b) is at least one amino- and/or hydroxy-functional compound which is different from components a) and c), has a functionality of 1 to 4 in the isocyanate addition reaction and has a molecular weight of 32 to 2000. Suitable compounds include monoalcohols such as methanol, n-butanol, n-butyl glycol, n-hexanol, stearyl alcohol, the isomeric octadecenols or octadecadienols and benzyl alcohol; dihydric alcohols such as neopentyl glycol, 1,6-hexanediol and 1,4-bis-hydroxymethyl cyclohexane; trihydric alcohols such as glycerol and trimethylol propane; tetrahydric alcohols such as pentaerythritol and the alkoxylation products of such alcohols; aminoalcohols such as ethanol, diethanolamine and aminomethyl propanol; and amines such as N-methyl cyclohexylamine, stearylamine, diethylenetriamine, 1,6-diaminohexane and isophoronediamine.

Component c) is at least one 2,2-bis-(hydroxymethyl)-alkane carboxylic acid containing a total of at least 5 carbon atoms, preferably 2,2-bis-(hydroxymethyl)-propionic acid (dimethylol propionic acid) or a tertiary amine salt of such acid, for example, the triethylamine salt of dimethylol propionic acid.

Component d) or g) is at least one at least difunctional isocyanate compound having a molecular weight of 168 to 1500. Suitable isocyanate compounds include hexamethylene diisocyanate, perhydro-2,4- and -4,4'-diphenyl methane diisocyanate, isophorone diisocyanate, toluylene diisocyanate, naphthylene diisocyanate and other isocyanates of the type described, for example, in Houben-Weyl, "Methoden der organischen Chemie", Vol. 14/2, 4th Edition, Georg Thieme Verlag Stuttgart, 1963, pages 61 to 70.

Other suitable isocyanate compounds include modified polyisocyanates prepared from hexamethylene diisocyanate, isophorone diisocyanate and toluylene diisocyanate and containing, for example, urethane groups, uretdione groups, isocyanurate groups and/or biuret groups. It is preferred to use hexamethylene diisocyanate, isophorone diisocyanate and modified polyisocyanates prepared from hexamethylene diisocyanate of the type mentioned, for example, in the description of component B) hereinafter. Mixtures of the above-mentioned polyisocyanates and other polyisocyanates are also suitable.

Starting components f) and i) are at least one arthydride of a di-, tri- and/or tetracarboxylic acid such as tetrahydrophthalic anhydride, maleic anhydride, phthalic arthydride, trimellitic anhydride and/or pyromellitic anhydride.

The polyester resins A3) containing hydroxyl and sulfonate groups are produced in known manner by the polycondensation of the above-mentioned starting materials a1) to a6) in the quantities shown together with a7) 0.5 to 25%, preferably 2 to 12%, by weight of a synthesis component containing sulfonate groups and selected from alcohols containing sulfonate groups and aromatic carboxylic acids containing sulfonate groups, wherein the percentages adding up to 100%.

The reaction may be carried out in the presence of known esterification catalysts, preferably by melt or azeotropic condensation, at temperatures of 140° to 240° C. with removal of water. A modifying reaction may optionally be carried out thereafter to introduce urethane groups by reaction with polyisocyanates containing two or more isocyanate groups of the type described for components d) and g).

Suitable starting components a7) include lithium, potassium, sodium, magnesium, calcium or tertiary amine salts of 5-sulfoisophthalic acid, sulfobenzoic acid, sulfophthalic acid, dimethyl sulfoisophthalic acid, 3-hydroxy-5-sulfobenzoic acid and 2-hydroxy-5-sulfobenzoic acid. Sulfonate diols of the type described, for example, in DE-OS 2,446,440 (U.S. Pat. No. 4,108,814) are also suitable as starting component a7). The carboxy-functional sulfonates obtainable by the neutralization of the sulfonic acid group of aromatic sulfocarboxylic acids having a molecular weight of 224 to 360 with lithium, potassium or sodium hydroxide, carbonate or bicarbonate or with t-amines are preferably used as starting component a7).

Suitable tertiary amines for neutralizing the sulfonic acid groups include triethylamine, N,N-dimethyl ethanolamine, N-methyl diethanolamine and other tertiary amines. It is also possible, though less preferred, to carry out the polycondensation reaction using the corresponding acids containing free carboxyl and sulfonic acid groups and to subsequently at least partially neutralize the sulfonic acid groups after their incorporation in the polyester resins.

Suitable solvents for the production of polyester resins A1) to A3) include N-methyl pyrrolidone, diethylene glycol dimethyl ether, methyl ethyl ketone, methyl isobutyl ketone, acetone, xylene, toluene, butyl acetate and mixtures of these and other solvents. The organic solvents may be completely or partly removed from the reaction mixture (e.g., azeotropically, by the application of a vacuum and/or by an intensified inert gas stream) before, during or after the dispersing step.

Suitable catalysts for the urethanization reaction include tertiary amines such as triethylamine, tin(II) octoate, dibutyl tin oxide, dibutyl tin dilaurate and other known catalysts.

Suitable catalysts for the esterification reaction include dibutyl tin oxide, sulfuric acid and p-toluenesulfonic acid.

When synthesis components not already present in the salt form have been used in the production of the polyester resins in a quantity which would be sufficient to establish dispersibility in water if present in salt form, at least a portion, preferably 25 to 100% and more preferably 40 to 100% of the incorporated acid groups are converted into the salt form. Suitable neutralizing agents include ammonia, N-methyl morpholine, triethylamine, dimethyl ethanolamine, sodium hydroxide, lithium hydroxide and potassium hydroxide. The neutralizing agents may also be used in more than the stoichiometric quantity.

After the production of the polyester resins, small quantities of other organic solvents or reactive thinners such as ethanol, propanol, ethylene glycol, propylene glycol, butanol, butyl glycol, hexanol, octanol, butyl diglycol, glycerol, ethyl diglycol, methyl diglycol and methoxypropanol may also be added to obtain certain properties.

Alternatively, the polyester resins A1) to A3) may be dispersed by adding 1) the mixture of water and neutralizing agent to the resin, 2) water to the mixture of resin and neutralizing agent, 3) the resin to the mixture of water and neutralizing agent or 4) the mixture of resin and neutralizing agent to the water.

If desired, the dispersibility of the resins in water may be improved by the use of external emulsifiers such as ethoxylated nonylphenol during the dispersing step.

The dispersing step is normally carried out at 40° to 120° C. The aqueous solutions or dispersions of polyester resins A1) to A3), which may be used for the preparation of the polyol component A) according to the invention, generally have a solids content of 20 to 65% by weight, preferably 30 to 55% by weight. Their content of (isocyanate inert) solvents and (isocyanate-reactive) reactive thinners is generally at most 8% by weight, preferably at most 6% by weight and more preferably at most 1.5% by weight.

The polyol component A4) is selected from polymers of olefinically unsaturated monomers which contain hydroxyl groups; sulfonate and/or carboxylate groups, preferably carboxylate groups; and optionally sulfonic acid and/or carboxyl groups, preferably carboxyl groups. These polymers preferably have a molecular weight ($M_w$, weight average, as determined by gel permeation chromatography using polystyrene as standard) of 500 to 100,000, more preferably 1000 to 50,000; a hydroxyl number of 16.5 to 264, preferably of 33 to 165 mg KOH/g; an acid number (based on all sulfonic acid and/or carboxyl groups, wherein 25 to 100% are present in saltform) of 5 to 125 mg KOH/g.

In a particularly preferred embodiment, the artionic groups are carboxylate groups.

The polymer resins A4) are generally used in the form of aqueous solutions and/or dispersions having a solids content of 10 to 50% by weight, preferably 20 to 40% by weight; a viscosity of 10 to 100,000, preferably 100 to 10,000, mPa.s/23° C.; and a pH of 5 to 10, preferably 6 to 9, for the production of the coating compositions according to the invention.

Depending upon the molecular weight of the polymers and their content of artionic groups or free acid groups, particularly carboxyl groups, the water-based systems containing the polymers may be either colloidal dispersions or molecular dispersions, but are generally a mixture of both of these types of dispersions.

Hydroxy-functional polymer resins a4) are produced by the known copolymerization of olefinically unsaturated monomers. Both hydroxy-functional monomers n) and monomers m) which contain acid groups (i.e., sulfonic acid groups or carboxyl groups, preferably carboxyl groups) are copolymerized, generally together with other monomers o), after which the acid groups present are at least partly neutralized.

The monomers containing acid groups are used to incorporate carboxyl and/or sulfonic acid groups in the copolymers which, by virtue of their hydrophilic character, ensure the solubility or dispersibility of the polymers in water, after at least partial neutralization of the acid groups. The quantity of "acidic" comonomers used and the degree of neutralization of the "acidic" polymers initially obtained corresponds to the previously mentioned requirements regarding the acid number and the content of sulfonate and/or carboxylate groups.

The "acidic" comonomers are used in quantities of 0.3 to 30% by weight, preferably in quantities of 1 to 20% by weight, based on the total weight of the monomers used. When less than 5% by weight of "acidic" monomers are used, aqueous dispersions containing a small amount of polymer in molecularly dispersed form are generally obtained, even after complete neutralization. With higher contents of "acidic" monomers and a constant degree of neutralization, increasing percentages of species in molecularly disperses form are obtained until, finally, the colloidally disperse components disappear at a content of acidic monomers above about 12% by weight.

Acidic comonomers m) include any olefinically unsaturated, polymerizable compounds which contain at least one carboxyl and/or sulfonic acid group. Examples include olefinically unsaturated mono- or dicarboxylic acids having a molecular weight of 72 to 207 such as acrylic acid, methacrylic acid, maleic acid, itaconic acid; and olefinically unsaturated compounds containing sulfonic acid groups such as 2-acrylamido-2-methyl propanesulfonic acid; and mixtures of these olefinically unsaturated acids.

The hydroxy-functional monomers n) are used in quantities sufficient to obtain the hydroxyl numbers previously set forth, i.e., hydroxyl group contents of 0.5 to 8% by weight, preferably 1 to 5% by weight. The hydroxy-functional comonomers are generally used in quantities of 3 to 75% by weight, preferably 6 to 47% by weight, based on the total weight of the monomers. In addition, it is important to ensure that the quantities of hydroxy-functional monomers are also selected so that, on a statistical average, the copolymers formed contain at least two hydroxyl groups per molecule.

Suitable hydroxy-functional monomers n) include hydroxyalkyl esters of acrylic acid or methacrylic acid, preferably containing 2 to 4 carbon atoms in the alkyl radical, such as 2-hydroxyethyl acrylate or methacrylate, the isomeric hydroxypropyl (meth)acrylates formed by addition of propylene oxide onto (meth)acrylic acid, the isomeric hydroxybutyl acrylates and methacrylates and mixtures of such monomers.

A third group of olefinically unsaturated monomers o) which are generally used in the production of the copolymers are olefinically unsaturated compounds which contain neither acidic groups nor hydroxyl groups. These olefinically unsaturated compounds include esters of acrylic acid or methacrylic acid containing 1 to 18, preferably 1 to 8, carbon atoms in the alcohol radical (such as methyl acrylate, ethyl acrylate, isopropyl acrylate, n-propyl acrylate, n-butyl acrylate, 2-ethylhexyl acrylate, n-stearyl acrylate), the methacrylates corresponding to these acrylates, styrene; alkyl-substituted styreries, acrylonitrile, methacrylonitrile, vinyl acetate, vinyl stearate and mixtures of these monomers. Epoxy-functional comonomers such as glycidyl acrylate or methacrylate and other monomers such as N-methoxymethacrylamide or methacrylamide may also be used in small quantities.

The monomers o) which do not contain acid or hydroxyl groups are generally used in quantities of 5 to 90% by weight, preferably 40 to 80% by weight, based on the total weight of the monomers used.

The polymers A4) may be produced by known methods of polymerization, including bulk, solution, emulsion and suspension polymerization. The olefinic polymers are preferably produced in organic solution or in aqueous emulsion. Continuous or discontinuous polymerization processes are possible. Examples of the discontinuous processes include the batch process and the inflow process; the inflow process is preferred.

In the case of solution polymerization by the inflow method, the solvent is initially introduced alone or with a portion of the monomer mixture and heated to the polymerization temperature. The polymerization is radically initiated by initially introducing part of the monomer mixture and then introducing the remainder of the monomer mixture together with an initiator mixture over a period of 1 to 10 hours, preferably 3 to 6 hours. The polymerization mixture is then optionally reactivated to enable polymerization to be continued to a conversion of at least 99%.

To obtain variations in the final polymer, it is possible to introduce part of the monomers more slowly or more quickly and to begin or end their introduction earlier or later.

Suitable solvents include aromatic hydrocarbons such as benzene, xylene and chlorobenzene; esters such as ethyl acetate, butyl acetate, methyl glycol acetate, ethyl glycol acetate and methoxypropyl acetate; ethers such as butyl glycol, tetrahydrofuran, dioxane, ethyl glycol ether and diethylene glycol dimethyl ether; ketones such as acetone and methyl ethyl ketone; and halogen-containing solvents such as methylene chloride and trichloromonofluoroethane.

The polymerization may be initiated by initiators having radical decomposition half-lives at 80° to 180° C. of 0.01 to 400 mins. The copolymerization reaction generally takes place at temperatures set forth above, preferably at temperatures of 100° to 160° C. under a pressure of 1000 to 20,000 mbar. The exact polymerization temperature is determined by the type of initiator used. The initiators are used in quantities of 0.05 to 6% by weight, based on the total quantity of monomers.

Suitable initiators include aliphatic azo compounds such as azoisobutyronitrile, and peroxides such as dibenzoyl peroxide, t-butyl perpivalate, t-butyl per-2-ethyl hexanoate, t-butyl perbenzoate, t-butyl hydroperoxide, di-t-butyl peroxide, cumene hydroperoxide and also dicyclohexyl and dibenzyl peroxydicarbonate.

The molecular weight of polymers A4) may be regulated by using known regulators such as n-dodecyl mercaptan, diisopropyl xanthogen disulfide, di(methylene trimethylol propane) xanthogen disulfide and thioglycol. They are added in quantities of at most 3% by weight, based on the monomer mixture.

On completion of polymerization, the copolymers A4) are converted into an aqueous solution or dispersion by introducing the the organic polymer solution into an optionally preheated aqueous medium. The organic solvent may be removed by distillation or may remain in small quantities in the aqueous phase.

To obtain good solubility or dispersibility in water, a neutralizing agent, such as inorganic bases, ammonia or amines, is generally added to the water phase. Suitable inorganic bases include sodium hydroxide and potassium hydroxide. Suitable amines, in addition to ammonia, include trimethylamine, triethylamine and dimethyl ethanolamine. The neutralizing agents may be used in amounts which are greater or less than the stoichiometric quantity to obtain the above-mentioned acid number and contents of sulfonate and/or carboxyl groups, particularly carboxylate groups. In cases where the acidic groups present are completely neutralized, the acid number is zero and the content of sulfonate and/or carboxylate groups corresponds to the original content of sulfonic acid groups or carboxyl groups. In the event of partial neutralization, the content of sulfonate and/or carboxylate groups corresponds to the quantity of neutralizing agent used.

It is important to ensure, particularly when the neutralizing agent is used in more than the stoichiometric quantity, that a distinct increase in viscosity does not occur through the polyelectrolyte character of the polymers. The aqueous solutions or dispersions obtained have the above-mentioned concentrations and viscosities and generally contain less than 10% by weight, preferably less than 5% by weight of residual solvent. The substantially complete removal of solvents boiling at a higher temperature than water is possible by azeotropic distillation.

Another preferred process for the production of the polymer polyols A4) is emulsion polymerization process which is carried out directly in aqueous medium by copolymerizing hydroxy-functional monomers n), monomers m) containing acid groups (i.e., sulfonic acid or carboxyl groups, preferably carboxyl groups) and optionally other monomers o). Afterwards, the acid groups present are at least partially neutralized. The polymers are produced by the known emulsion polymerization process in aqueous medium. Continuous or discontinuous polymerization processes may be used.

Examples of discontinuous processes are the batch process and the inflow process; the inflow process is preferred. In the inflow process, water is initially introduced either alone or together with a portion of the anionic emulsifier and optionally a nonionic emulsifier or a portion of the monomer mixture, and heated to the polymerization temperature. The polymerization is radically initiated by initially introducing part of the monomer mixture and then introducing the remainder of the monomer mixture together with an initiator mixture and the emulsifier over a period of 1 to 10 hours, preferably 3 to 6 hours. The polymerization mixture is then optionally reactivated to enable polymerization to be continued to a conversion of at least 99%.

The emulsifiers used are artionic and/or nonionic emulsifiers. Of the anionic emulsifiers, those containing carboxylate groups, sulfate groups, sulfonate groups, phosphate groups or phosphonate groups may be used. Emulsifiers containing sulfate, sulfonate, phosphate or phosphonate groups are preferred. The emulsifiers may be have a low or high molecular weight. High molecular weight emulsifiers are described, for example, in DE-OS 3,806,066 and in DE-AS 1,953,941. Anionic emulsifiers which have been neutralized with ammonia or amines are preferred. Particularly preferred emulsifiers are long-chain alcohols or substituted phenols having ethylene oxide chains with degrees of polymerization of 2 to 100 and a terminal monosulfuric acid ester group, a terminal phosphoric acid monoester group or a terminal phosphoric acid diester group. Ammonia is generally used as the neutralizing agent. The emulsifiers may be added to the emulsion either individually or in admixture.

Suitable nonionic emulsifiers which may generally be used in combination with these anionic emulsifiers are reaction products of aliphatic, araliphatic, cycloaliphatic or aromatic carboxylic acids, alcohols, phenol derivatives or amines with epoxides such as ethylene oxide. Examples of such reaction products include reaction products of ethylene oxide with carboxylic acids such as lauric acid, stearic acid, oleic acid, the carboxylic acids of castor oil and abietic acid; relatively long-chain alcohols such as oleyl alcohol, lauryl alcohol and stearyl alcohol; phenol derivatives such as substituted benzylphenols, phenylphenols and nonylphenol; and relatively long-chain amines such as dodecyl amine and stearyl amine. The reaction products with ethylene oxide are oligoethers and polyethers having degrees of polymerization of 2 to 100, preferably 5 to 50.

These emulsifiers are added in quantities of 0.1 to 10% by weight, based on the mixture of monomers. Both water-soluble and water-insoluble solvents may be used as co-solvents. Suitable co-solvents include aromatic hydrocarbons such as benzene, toluene, xylene and chlorobenzene; esters such as ethyl acetate, butyl acetate, methyl glycol acetate, ethyl glycol acetate and methoxypropyl acetate; ethers such as butyl glycol, tetrahydrofuran, dioxane, ethyl glycol ether and ethers of diglycol; ketones such as acetone, methyl ethyl ketone and methyl isobutyl ketone; trichloromonofluoroethane; and cyclic amides such as N-methyl pyrrolidone and N-methyl caprolactam.

The polymerization may be initiated by water-soluble or water-insoluble initiators or initiator systems having radical decomposition half lives at temperatures of 10° to 100° C. of 0.01 to 400 minutes. The aqueous emulsion polymerization is generally carried out at the temperature set forth above, preferably at a temperature of 30° to 90° C., under a pressure of 1000 to 20,000 mbar. The exact polymerization temperature is determined by the type of initiator used. The initiators are used in quantities of 0.05 to 6% by weight, based on the total quantity of monomers.

Suitable initiators include water-soluble and water-insoluble azo compounds such as azoisobutyrodinitrile or 4,4'-azo-bis-(4-cyanopentanoic acid); and also inorganic and organic peroxides such as dibenzoyl peroxide, t-butyl perpivalate, t-butyl per-2-ethyl hexanoate, t-butyl perbenzoate, t-butyl hydroperoxide, di-t-butyl peroxide, cumene hydroperoxide, dicyclohexyl and dibenzyl peroxydicarbonate, hydrogen peroxide and the sodium, potassium or ammonium salts of peroxydisulfuric acid. The peroxydisulfates and hydrogen peroxide are often used in composition with reducing agents such as the sodium salt of formamidine sulfinic acid (Rongalit C), ascorbic acid or polyalkylene polyamines. A distinct reduction in the polymerization temperature is generally obtained in this way.

The molecular weight of the polymers may be regulated by known regulators such as n-dodecyl mercaptan, t-dodecyl mercaptan, diisopropyl xanthogen disulfide, di(methylene trimethylol propane) xanthogen disulfide and thioglycol. The regulators are used in quantities of at most 3% by weight, based on the monomer mixture.

On completion of polymerization, the polymers present in aqueous dispersion are optionally neutralized with neutralizing agents to degree of neutralization of 25 to 100%, preferably 35 to 100%. Neutralizing agents include inorganic bases, ammonia or amines. Suitable inorganic bases include sodium hydroxide and potassium hydroxide. Suitable amines, in addition to ammonia, include trimethylamine, triethylamine, dimethyl ethanolamine, methyl diethanolamine, triethanolamine, etc. The neutralizing agents may be used in amounts which are greater or less than the stoichiometric quantity, resulting in the above-mentioned acid numbers and contents of sulfonate and/or carboxylate groups, preferably carboxylate groups.

Where the acid groups present are completely neutralized, the acid number is zero and the content of sulfonate and/or carboxylate groups corresponds to the original content of sulfonic acid groups or carboxyl groups. When the acid groups are partially neutralized, the content of sulfonate and/or carboxylate groups corresponds to the quantity of neutralizing agent used. It is particularly important to ensure, particularly where the neutralizing agent is used in more than the stoichiometric quantity, that a distinct increase in viscosity does not occur through the polyelectrolyte character of the polymers. The aqueous solutions or dispersions obtained have the above-mentioned concentrations and viscosities.

Any co-solvents added may remain in the aqueous dispersion in quantities of up to about 20% by weight, based on the aqueous phase. If required, however, the co-solvents may be removed by distillation after polymerization.

Component A5) is an acrylate-grafted polyester resin containing hydroxy and carboxylate or sulfonate groups. These polymers have a molecular weight ($M_w$) of 3000 to 100,000, a hydroxyl number of 20 to 300 mg KOH/g and an acid number, based on all of the carboxyl or sulfonic acid groups of 5 to 75. Generally, 25 to 100%, preferably 100%, of the carboxyl or sulfonic acid groups are present in salt form.

The acrylate-grafted polyester resins are produced by polymerizing 10 to 95% by weight, preferably 50 to 90% by weight, of a monomer mixture p) containing acid groups in the presence of 5 to 90% by weight, preferably 10 to 50% by weight, of a polyester polyol q). The monomer mixture p) contains monomers m) and n) and optionally o) which have been described above. The polyester polyol q) has a hydroxyl number of 10 to 500, preferably 75 to 300; an acid number of <30; and a double bond content (expressed as C=C, molecular weight 24) of 0 to 10%.

The polyesters may contain as structural units those structural units mentioned above under a1) to a6) and optionally a7).

The graft polymerization may be carried out in a 50 to 90% solution, but preferably in the absence of solvents, at 90° to 180° C. using the initiators and optional molecular weight regulators set forth above. The polyester and solvent, if any, are initially introduced and the monomer mixture and initiator are subsequently added as previously described.

After the graft copolymerization, the polymer A5) is dispersed in water. The neutralizing agents described above are then added unless this has already been done.

Auxiliary solvents may be used in the preparation of the polyol components A1) to A5). However, the quantity in which they are used is preferably limited to such an extent or, after preparation of the individual components A1) to A5), is reduced to such an extent that the isocyanate-inert solvents aqueous polyol component A) in a quantity of at most 8% by weight, preferably at most 5% by weight and more preferably 1.5% by weight. The (isocyanate-reactive) reactive thinners are also present in the aqueous solutions or dispersions A) in a quantity of at most 8% by weight, preferably at most 5% by weight. In a particularly preferred embodiment, no reactive thinners are used.

To prepare the aqueous solutions or dispersions A), the aqueous solutions or dispersions of the individual components A1) to A5) are mixed with one another in any ratio, provided that at least two of the individual components A1) to A5) are present in the mixture in a quantity of at least 5% by weight each, preferably at least 15% by weight each. The preferred content of dissolved and/or dispersed polyhydroxyl compounds A1) to A5) in the aqueous solutions or dispersions A) is 25 to 50% by weight.

The polyisocyanate component B) may be any organic polyisocyanate which are liquid at room temperature and contain aliphatically, cycloaliphatically, araliphatically and/or aromatically bound free isocyanate groups. Polyisocyanate component B) has a viscosity at 23° C. of 50 to 10,000 mPa.s, preferably 50 to 1000 mPa.s. In a particularly preferred embodiment, polyisocyanate component B) is a polyisocyanate or polyisocyanate mixture contains only aliphatically and/or cycloaliphatically bound isocyanates, has an (average) NCO functionality of 2.2 to 5.0 and has a viscosity at 23° C. of 50 to 500 mPa.s.

If necessary, the polyisocyanates may be used in admixture with small quantities of inert solvents to reduce the viscosity to a value within these ranges. However, the maximum quantity in which the inert solvent is used is limited so that the coating compositions according to the invention contain at most 20% by weight of solvent, based on the quantity of water, any solvent still present in the polyester dispersions or solutions A) being included in the calculation.

Solvents suitable as additives for the polyisocyanates include aromatic hydrocarbons such as "solvent naphtha" and also the solvents previously described.

Particularly suitable polyisocyanates include modified polyisocyanates prepared from hexamethylene diisocyanate, 1-isocyanato-3,3,5-trimethyl-5-isocyanatomethyl cyclohexane (IPDI) and/or bis-(isocyanatocyclohexyl)-methane, preferably those prepared exclusively from hexamethylene diisocyanate.

Modified polyisocyanates are those containing biuret, urethane, uretdione and/or isocyanurate groups and prepared from known diisocyanates preferably those set forth above. After their production they are freed from excess starting diisocyanate in known manner, preferably by distillation, to a residual content of less than 0.5% by weight of unreacted diisocyanate.

Preferred aliphatic polyisocyanates used in accordance with the invention include biuret-modified polyisocyanates prepared from hexamethylene diisocyanate, e.g., by the processes according to U.S. Pat. Nos. 3,124,605, 3,358,010, 3,903,126, 3,903,127 or 3,976,622. These polyisocyanates contain mixtures of N,N',N"-tris-(6-isocyanatohexyl)-biuret with small amounts of its higher homologs. Also preferred as aliphatic polyisocyanates are the cyclic trimers of hexamethylene diisocyanate which may be obtained in accordance with U.S. Pat. No. 4,324,879 and contain N,N',N"-tris-(6-isocyanatohexyl)-isocyanurate in admixture with small quantities of its higher homologs.

Particularly preferred aliphatic polyisocyanates are mixtures of uretdione- and/or isocyanurate-modified polyisocyanates prepared by the catalytic oligomerization of hexamethylene diisocyanate using trialkyl phosphines. These particularly preferred mixtures have a viscosity of 50 to 500 mPa.s at 23° C. and an NCO functionality of 2.2 to 5.0.

The aromatic polyisocyanates which may also be used in accordance with the invention, but are less preferred, are modified polyisocyanates prepared from 2,4-diisocyanatotoluene or technical mixtures thereof with 2,6-diisocyanatotoluene or prepared from 4,4'-diisocyanatodiphenyl methane or mixtures thereof with its isomers and/or higher homologs. These aromatic modified polyisocyanates include the urethane-modified isocyanates obtained by reacting more than stoichiometric quantities of 2,4-diisocyanatotoluene with polyhydric alcohols, such as trimethylol propane, and subsequently removing the unreacted diisocyanate excess by distillation.

Other aromatic modified polyisocyanates include the trimers of the monomeric aromatic diisocyanates previously set forth, i.e., the corresponding isocyanatoisocyanurates which have also been freed from excess monomeric diisocyanates, preferably by distillation, after their production.

The polyisocyanates may be rendered hydrophilic to make it easier to emulsify the polyisocyanate in the aqueous phase and, in some cases, to provide an increase in pot life. Hydrophilic polyisocyanates may be obtained, for example, by the reaction of di- or polyisocyanates with monofunctional polyethers prepared from ethylene oxide and, optionally, propylene oxide and/or by the incorporation of carboxylate groups by a reaction with hydroxy-functional carboxylic acids, for example 2,2-dimethylol propionic acid or hydroxypivalic acid, and neutralization thereof before or after the reaction. However, it is not necessary to hydrophilically modify the polyisocyanates in order for them to be suitable for the present invention.

To produce the coating or sealing compositions according to the invention, the polyisocyanate component B) is emulsified in the aqueous dispersion A), which acts as an emulsifier for the polyisocyanate.

Mixing may be carried out by stirring at room temperature. The quantity in which the polyisocyanate component is used is selected so that the coating composition has an NCO:OH equivalent ratio, based on the isocyanate groups of component B) and the alcoholic hydroxyl groups of component A), of 0.2:1 to 5:1, preferably 0.5:1 to 2:1.

The known auxiliaries and additives of coatings technology may be incorporated in polyol component A) before it is blended with the polyisocyanate component B). Suitable auxiliaries and additives include foam inhibitors, flow control agents, pigments, pigment dispersion aids and the like.

The coating and sealing compositions according to the invention are suitable for various applications where solvent-containing, solventless or water-based painting and coating compositions with a superior property profile are currently used. These uses include the surface coating of various building materials such as lime- and/or cement-bonded plasters, gypsum-containing surfaces, fiber cement building materials and concrete; the painting and sealing of wood and wood materials such as chipboard, fiber board and paper; the painting and coating of metal surfaces; the painting and coating of asphalt- and bitumen-containing road surfaces; the painting and sealing of various plastic surfaces; and the coating of leather and textiles. The compositions are also suitable for the surface bonding of various materials, in which case materials of the same type or different types may be bonded to one another.

After application to a particular substrate, the two-component system may be cured or crosslinked at temperatures of 0° to 300° C., preferably room temperature to 200° C.

In the following examples, all percentages are by weight.

EXAMPLES

Starting materials

Polyisocyanate 1

A mixture of 70 parts by weight of a uretdione-modified, i.e. dimerized, hexamethylene diisocyanate terminated by two free NCO groups and 30 parts by weight of hexamethylene diisocyanate substantially trimerized to N,N',N''-tris-(6-isocyanatohexyl)-isocyanurate in admixture with small quantities of higher homologs of both products; the polyisocyanate has an average viscosity of 200 mPa.s/23° C. and an average free isocyanate content of 22.5%.

Preparation of a polyester polyol component A1)

1623 g of trimethylol propane, 1093 g of isophthalic acid, 1185 g of Prifac 2950 (a saturated fatty acid, available from Unichema), 383 g of neopentyl glycol and 608 g of hexahydrophthalic anhydride were weighed into a 6 liter reaction vessel equipped with a stirrer, cooling and heating system and water separator and heated in 1 hour to 140° C. while nitrogen was passed through. The mixture was then heated for 3 hours to 150° C. and for 7 hours to 220° C. Condensation was continued with removal of water until the polyester had a total acid number of 2.8 and an OH number of 216.

830 g of of the polyester described above, 40 g of dimethylol propionic acid, 75.3 g of N-methyl pyrrolidone (NMP) and 1.25 g of dibutyl tin dioctoate were weighed into a 2 liter reaction vessel equipped with a stirrer, cooling and heating system and homogenized under nitrogen at 120° C. After cooling to 80° C., 130 g of isophorone diisocyanate were added all at once. The reaction mixture was stirred at 120° C. until no more NCO groups could be detected. The resulting polyester containing urethane, carboxyl and hydroxyl groups was dispersed in a mixture of $NH_3$ and water. An aqueous dispersion of polyester polyol component A1) was obtained which had a solids content of approx. 48.5%, a pH of approx. 7.4, a degree of neutralization of 100%, an acid number of approx. 10 and a hydroxyl group content of approx. 4.6% was obtained.

Preparation of a polyester polyol component A2)

152.0 g of hexanediol, 130 g of neopentyl glycol, 50 g of 1,4-cyclohexane dimethanol, 164 g of trimethylol propane, 279 g of phthalic anhydride and 225 g of hexahydrophthalic anhydride were weighed under nitrogen into a 2 liter reaction vessel equipped with a stirrer, cooling and heating system and water separator and heated for 2 hours to 160° C. The mixture was then heated for 10 hours to 220° C. while nitrogen was continuously passed through. Esterification was continued until the acid number was approximately 4. After cooling to 120° C., 106.8 g of tetrahydrophthalic anhydride were added all at once and the temperature was kept at 120° to 130° C. until the total acid number was approx. 45. 200 g of dimethyl diglycol and 50 g of NMP were then added and the resin melt was dispersed at approx. 80° C. in a mixture of water and triethylamine. The aqueous polyester dispersion A2) had a solids content of approx. 38%, a degree of neutralization of approx. 90% and a hydroxyl group content of approx. 3.5%.

Preparation of a polyester polyol component A3)

280 g of neopentyl glycol, 180 g of trimethylol propane, 317 g of 1,6-hexanediol, 265 g of phthalic anhydride, 82.5 g of 5-(lithiumsulfo)-isophthalic acid and 0.75 g of dibutyl tin oxide were weighed into a 5 liter reaction vessel equipped with a stirrer, cooling and heating system and water separator and heated under nitrogen for 1 hour to 175° C. The reaction mixture was esterified at 175° C. until the solution became clear, after which 478 g of phthalic arthydride were added and the mixture was heated to 200° C. Heating was continued until an acid number of ≦10 was reached. After cooling to 100° C., distilled water was slowly added for 2 hours at 60° C. to disperse the polyester. An aqueous dispersion of polyester resin A3) was obtained which contained sulfonate and hydroxyl groups and had a solids content of approximately 5% and a hydroxyl group content of approx. 4.8%.

Preparation of a polymer resin A4).

900 g of n-butyl acetate were introduced into a 3 liter stirred autoclave equipped with a reflux condenser, stirrer, gas inlet and gas outlet and purged with nitrogen. Nitrogen was then passed over in a steady stream and the contents of the reaction vessel were heated with stirring at approx. 200 r.p.m. to an internal temperature of 110° C. A mixture of 459 g of 2-hydroxyethyl methacrylate, 231 g of methyl methacrylate, 600 g of n-butyl acrylate, 150 g of acrylic acid and 50 g of azoisobutyronitrile was then uniformly added over a period of 4 hours. After the addition, the mixture was stirred for approx. 30 minutes and then reactivated with a mixture of 10 g of t-butyl peroctoate and 100 g of n-butyl acetate. The after-reaction time was 6 hours. Approx. 100 ml of residual monomers were then distilled off together with the solvent (n-butyl acetate) under a vacuum of approx. 200 to 400 mbar. The quantity distilled off was replaced by fresh solvent. The polymer resin dissolved in the organic solvent had the following physicochemical data:

Concentration: 58.9% by weight
Viscosity (23° C.): 6.0 Pa.s
OH number: 79.7
Acid number: 46.6

To convert the organic solution into an aqueous solution or dispersion, a mixture of 3500 g of deionized water and 143 g of an aqueous ammonia solution (25%) was introduced into an 8 liter reactor and heated with stirring to approx. 95° C. The organic polymer solution was then added over a period of approx. 0.5 hour and n-butyl acetate was simultaneously removed by azeotropic distillation. The quantity of water distilled off was continuously replaced. The pH was adjusted to a value of 7.0 with an approx. 25% aqueous ammonia solution. The solids content was adjusted to 30%. The physicochemical data of the aqueous solution or dispersion were as follows:

Solids content: 30%
Carboxylate groups: 139 milliequivalents/100 g of solids
Hydroxyl group content (based on solids): 4.6%

Preparation of an acrylate grafted polyester Component A5)

771.8 g of trimethylol propane, 476.1 g of phthalic anhydride, 63.3 g of maleic anhydride, 939.3 g of adipic acid, 759.0 g of 1,6-hexanediol and 669.2 g of neopentyl glycol were weighed into a 6 liter reaction vessel equipped with a stirrer, cooling and heating system and water separator and heated under nitrogen for 1 hour to 140° C. The mixture was then heated for 6 hours to 200° C. and condensed with removal of water until the acid number has fallen below 12. 321.4 g of Prifac 2950 (a product of Unichema International) were then added and condensation was continued with removal of water at 200° C. until the polyester had a total acid number of 2.0 and an OH number of 298.

166.7 g of of the polyester intermediate and 36.7 g of butyl glycol were weighed into a 2 liter reaction vessel equipped with a stirrer, cooling and heating system and heated to 125° C. A mixture of 83.3 g of n-butyl acrylate, 100.0 g of hydroxyethyl methacrylate, 141.7 g of methyl methacrylate and 3.3 g of n-dodecyl mercaptan was then added to the polyester solution over a period of 2 hours. A mixture of 41.7 g of n-butyl acrylate, 50.0 g of hydroxyethyl methacrylate, 70.8 g of methyl methacrylate, 12.5 g of methacrylic acid and 1.7 g of n-dodecyl mercaptan was then added over a period of 1 hour. Beginning with the addition of the monomers, 17.9 g of tert. butyl per-2-ethyl hexanoate (70% solution in a hydrocarbon mixture) were then simultaneously added over a period of 4 hours. After the peroxide has been added, the reaction mixture was stirred for 2 hours at 125° C.

The grafted polyester resin was neutralized with 19.6 g of dimethyl ethanolamine and dispersed with 780 g of water. A solids content of approx. 43.2% was obtained by the addition of water.

The polyester resin A5) grafted with vinyl monomers had an OH content of approx. 5.2%, an acid number of approx. 18 and a degree of neutralization of approx. 100%.

APPLICATION EXAMPLES

Example 1

50 parts by weight of aqueous polyacrylate dispersion A4) were mixed with 50 parts by weight of the aqueous dispersion of urethanized polyester A1).

1.14 parts by weight of a 20% by weight solution of a commercial thickener in water (Acrysol RM 8, a product of Rohm and Haas, Frankfurt), 0.8 part by weight of a 25% by weight of aqueous solution of a commercial emulsifier (Emulgator WN, Bayer AG, Leverkusen), 0.93 part by weight of a commercial foam inhibitor (Bevaloid 581 B, Erbsloh, Dusseldorf) and 4.9 parts by weight of demineralized water were added to and homogenized with dispersion A). The preparation was almost indefinitely storage stable. 28.88 parts by weight of polyisocyanate 1 were then added to the preparation described above and mixed therewith by simple stirring. A waterborne two-component polyurethane coating composition with a pot life of approx. 5 hours was formed. The NCO:OH equivalent ratio was 1.5.

The coating composition, which was applied in a wet film thickness of 200 μm (which corresponds to a dry film thickness of approx. 50 μm), initially appeared milky and cloudy, but became completely clear and transparent over a period of 30 to 60 minutes at room temperature, i.e., with increasing evaporation of water.

The coating had a dust-free time of approx. 2 to 3 hours. Final curing was achieved after 10 to 14 days. The cured coating then had the following properties:

| Optical appearance (gloss/transparency): | very good |
|---|---|
| Pendulum hardness (Albert/König): | 100–120 secs. |
| Solvent resistance | very good |
| White spirit: | |
| Solvent naphtha 100: | very good |
| Methoxypropyl acetate: | very good |
| Acetone: | good/moderate |
| Ethanol: | good |

The same property profile was also achieved by forced drying for 1 h at 80° to 100° C. and by stoving for 30 minutes at 130° to 150° C.

Example 2

25 parts by weight of polyester dispersion A1) were mixed with 75 parts by weight of polyacrylate dispersion A4) to form polyol component A). 1.7 parts by weight of the 20% thickener solution from Example 1, 0.7 parts by weight of the 25% emulsifier solution from Example 1, 0.8 parts by weight of foam inhibitor from Example 1 and 6.0 parts by weight of water were then mixed with polyol component A).

24.44 parts by weight of polyisocyanate 1 were then added to the preparation described above and homogenized therewith by simple stirring. A waterborne two-component polyurethane coating composition having a pot life of approx. 5 hours was formed. The NCO:OH equivalent ratio was 1.5.

The aqueous polyurethane coating composition, which was applied in a wet film thickness of 200 μm (corresponding to a dry film thickness of approx. 50 μm), initially appeared milky and cloudy, but became completely clear and transparent over a period of 30 to 60 minutes at room temperature, i.e. with increasing evaporation of water. The coating had a dust-free time of approx. 2 to 3 hours. Final curing was achieved after 10 to 14 days. The cured coating then had the following properties:

| Optical appearance (gloss/transparency): | very good |
|---|---|
| Pendulum hardness (Albert/König): | 90–120 secs. |
| Solvent resistance | very good |
| White spirit: | |
| Solvent naphtha 100: | very good |
| Methoxypropyl acetate: | very good |
| Acetone: | good/moderate |
| Ethanol: | good |

The same property profile was also achieved by forced drying for 1 h at 80° to 100° C. and by stoving for 30 minutes at 130° to 150° C.

Example 3

Example 1 was repeated except that polyol component A) was prepared from 25 parts of polyacrylate dispersion A4) and 75 parts of polyester dispersion A1).

32.87 parts by weight of polyisocyanate 1 were added as component B) which corresponded to an NCO:OH equivalent ratio of 1.5.

The cured coating had the following properties:

| Optical appearance (gloss/transparency): | very good |
|---|---|
| Pendulum hardness (Albert/König): | 80–100 secs. |
| Solvent resistance | very good |
| White spirit: | |
| Solvent naphtha 100: | very good |
| Methoxypropyl acetate: | very good |
| Acetone: | good/moderate |
| Ethanol: | good |

The same property profile was also achieved by forced drying for 1 h at 80° to 100° C. and by stoving for 30 minutes at 130° to 150° C.

Example 4

Example 3 was repeated except that polyacrylate dispersion A4) was replaced by the same quantity of polyester dispersion A2).

The cured coating had the following properties:

| Optical appearance (gloss/transparency): | very good |
|---|---|
| Pendulum hardness (Albert/König): | approx. 80 secs. |
| Solvent resistance | very good |
| White spirit: | |
| Solvent naphtha 100: | very good |
| Methoxypropyl acetate: | very good |
| Acetone: | good/moderate |
| Ethanol: | good/moderate |

Example 5

Example 2 was repeated except that polyester dispersion A1) was replaced by the same quantity of polyester dispersion A3).

The cured coating had the following properties:

| Optical appearance (gloss/transparency): | good/very good |
|---|---|
| Pendulum hardness (Albert/König): | approx. 100 secs. |
| Solvent resistance | very good |
| White spirit: | |
| Solvent naphtha 100: | very good |
| Methoxypropyl acetate: | very good/good |
| Acetone: | good/moderate |
| Ethanol: | good |

Example 6

Example 3 was repeated except that polyester dispersion A1) was replaced by the same quantity of graft polyester dispersion A5).

The cured coating had the following properties:

| Optical appearance (gloss/transparency): | good/very good |
|---|---|
| Pendulum hardness (Albert/König): | 120/130 secs. |
| Solvent resistance | very good |
| White spirit: | |
| Solvent naphtha 100: | very good |
| Methoxypropyl acetate: | good/very good |
| Acetone: | good |
| Ethanol: | good |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A water-based binder composition comprising

A) an aqueous solution or dispersion of a water-dilutable organic polyol component containing a mixture of at least 5% by weight each of at least two hydroxy-functional polymers selected from at least two of the following groups A1) polyester resins containing hydroxyl, urethane and carboxylate groups and having a molecular weight ($M_w$) of 3000 to 100,000, a hydroxyl number of 20 to 240, an acid number (based on all of the carboxyl groups, wherein 25 to 100% are present in carboxylate form) of 8 to 60 and a urethane group content (—NH—CO—O—) of 1.0 to 15.0% by weight, A2) polyester resins containing hydroxyl and carboxylate groups, but no urethane or sulfonate groups, and having a molecular weight ($M_w$) of 1000 to 50,000, a hydroxyl number of 15 to 240 and an acid number (based on all of the carboxyl groups, wherein 25 to 100% are present in carboxylate form) of 15 to 90, A3) polyester resins containing hydroxyl and sulfonate groups and, optionally, carboxylate groups and/or urethane groups and having a molecular weight ($M_w$) of 1000 to 50,000, a hydroxyl number of 15 to 240 and an acid number (based on all the sulfonic acid and optional carboxyl groups, wherein 25 to 100% are present in salt form) of 3 to 45, A4) polyacrylate resins containing hydroxyl groups, and also carboxylate and/or sulfonate groups and having a molecular weight ($M_w$) of 500 to 100,000, a hydroxyl number of 15 to 270 and an acid number (based on all the carboxyl and sulfonic acid groups, wherein 25 to 100% are present in salt form) of 5 to 125 and A5) acrylate-grafted polyester resins containing hydroxyl groups, and also carboxylate and/or sulfonate groups and having a molecular weight ($M_w$) of 3000 to 100,000, a hydroxyl number of 20 to 300 and an acid number (based on al the carboxyl and sulfonic acid groups, wherein 25 to 100% are present in salt form) of 5 to 75, and B) a polyisocyanate component which is emulsified in the aqueous solution or dispersion A), has a viscosity at 23° C. of 50 to 10,000 mPa.s and contains one or more organic polyisocyanates, wherein the NCO:OH equivalent ratio, based on the isocyanate groups of component B) and the hydroxyl groups of the polyol component present in A), is 0.2:1 to 5:1.

2. The binder composition of claim 1 wherein polyol component A) contains at least 5% by weight of polyol component A1) which is based on one or more polyols which are the reaction product of a) 65 to 94% by weight of a polyester polyol having a hydroxyl number of 50 to 500 and an acid number of $\leq 12$, b) 0 to 35% by weight of at least one amino- and/or hydroxy-functional compound which is different from components a) or c), has a functionality of 1 to 4 in the isocyanate addition reaction and has a molecular weight of 32 to 2000, c) 2.0 to 7.5% by weight of a 2,2-bis-(hydroxymethyl)-alkane carboxylic acid or a tertiary amine salt of such acid in an amount which corresponds to 2.0 to 7.5% by weight of the acid and d) 5 to 30% by weight of at least one polyisocyanate having two or more isocyanate groups and a molecular weight of 168 to 1500, wherein the percentages of a) to d) add up to 100%, or the reaction product of e) 60 to 97% by weight of a polyester polyol having a hydroxyl number of 50 to 500 and an acid number of $\leq 12$, f) 2 to 20% by weight of a di-, tri- and/or tetracarboxylic anhydride and g) 0.1 to 20% by weight of at least one polyisocyanate having two or more isocyanate groups and a molecular weight of 168 to 1500, wherein the percentages of e) to g) add up to 100%.

3. The binder composition of claim 1 wherein polyol component A) contains at least 5% by weight of polyol component A2) which is based on one or more polyols which are the reaction product of h) 75 to 98% by weight of a polyester polyol having a hydroxyl number of 50 to 500 and an acid number of $\leq 12$ and i) 2 to 25% by weight of a di-, tri- and/or tetracarboxylic anhydride, wherein the percentages of h) and i) add up to 100%.

4. The binder composition of claim 1 wherein polyol component A) contains at least 5% by weight of polyol component A3) which is based on one or more polyols which are the reaction product of a1) 0 to 60% by weight of a monocarboxylic acid having a molecular weight of 112 to 340, a2) 10 to 65% by weight of a polycarboxylic acid having a molecular weight of 98 to 600 or an anhydride thereof, a3) 5 to 70% by weight of a difunctional or higher alcohol having a molecular weight of 62 to 2000, a4) 0 to 30% by weight of a monohydric alcohol having a molecular weight of 100 to 299, a5) 0 to 15% by weight of a hydroxycarboxylic acid having a molecular weight of 90 to 280 or a lactone thereof, a6) 0 to 15% by weight of an aminoalcohol having a molecular weight of 61 to 300 and/or an aminocarboxylic acid having a molecular weight of 75 to 260 and a7) 0.5 to 25% by weight of a synthesis component containing sulfonate groups and selected from the group consisting of alcohols containing sulfonate groups and aromatic carboxylic acids containing sulfonate groups.

wherein the percentages of a1) to a7) add up to 100%.

5. The binder composition of claim 1 wherein polyol component A) contains at least 5% by weight of polyol component A4) which is based on one or more polyols which are obtained by the copolymerization of m) 0.3 to 30% by weight of one or more monomers containing carboxyl and/or sulfonic acid groups, n) 3 to 75% by weight of one or more hydroxy-functional monomers and o) 5 to 90% by weight of one or more other copolymerizable monomers, wherein the percentages of m) to o) add up to 100%.

6. The binder composition of claim 2 wherein polyol component A) contains at least 5% by weight of polyol component A4) which is based on one or more polyols which are obtained by the copolymerization of m) 0.3 to 30% by weight of one or more monomers containing carboxyl and/or sulfonic acid groups, n) 3 to 75% by weight of one or more hydroxy-functional monomers and o) 5 to 90% by weight of one or more other copolymerizable monomers, wherein the percentages of m) to o) add up to 100%.

7. The binder composition of claim 1 wherein polyol component A) contains at least 5% by weight of polyol component A5) which is based on one or more polyols obtained by the graft copolymerization of p) 10 to 95% by weight of a monomer mixture containing m) $\alpha,\beta$-unsaturated carboxylic acids, n) $\alpha,\beta$-unsaturated hydroxy-functional monomers, o) other copolymerizable monomers in the presence of q) 5 to 90% by weight of a polyester polyol having a hydroxyl number of 10 to 500, an acid number of at most 30 and a content of olefinic double bonds (expressed as C=C, molecular weight 24) of 0 to 10% by weight, wherein the percentage of p) and q) add up to 100%.

8. The binder composition of claim 1 wherein polyisocyanate component B) is based on one or more organic polyisocyanates containing only (cyclo)aliphatically bound isocyanate groups.

9. The binder composition of claim 1 wherein the organic polyisocyanates of polyisocyanate component B) are rendered hydrophilic by the incorporation of hydrophilic nonionic groups and/or carboxylate groups.

10. The binder composition of claim 8 wherein the organic polyisocyanates of polyisocyanate component B) are rendered hydrophilic by the incorporation of hydrophilic nonionic groups and/or carboxylate groups.

* * * * *